June 21, 1960  W. C. BENSON  2,941,817
ADJUSTABLE VEHICLE AXLE AND AIR SUSPENSION ASSEMBLY
Filed March 21, 1955
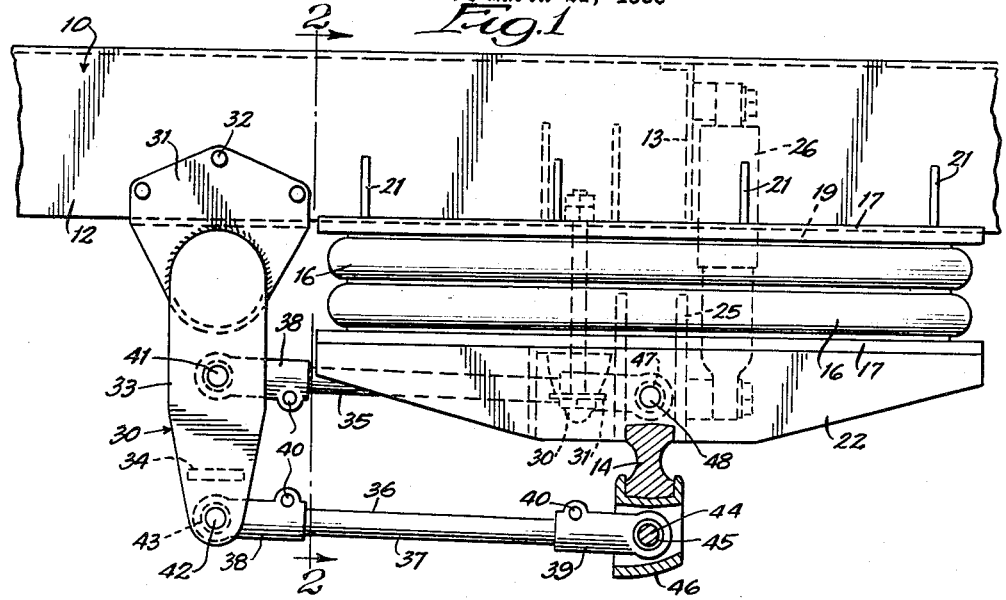
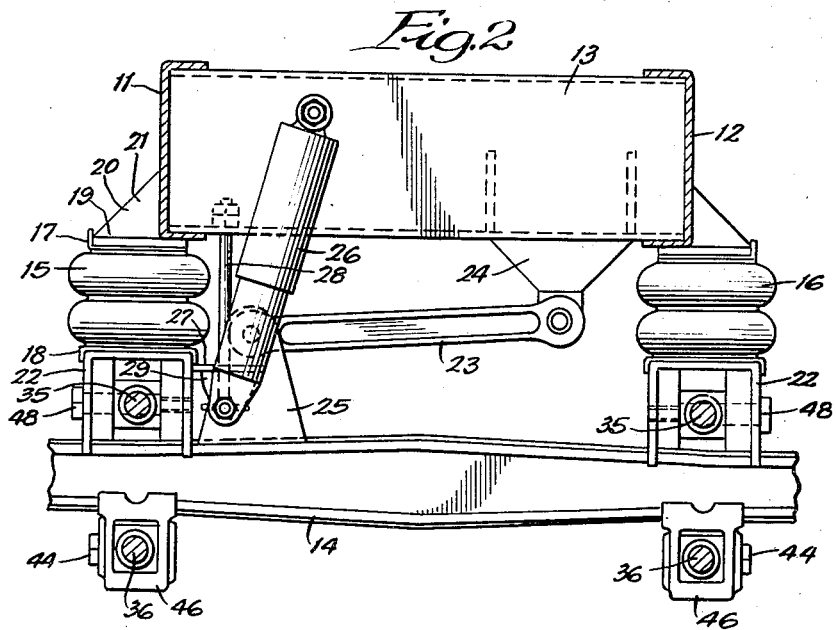
INVENTOR.
William C. Benson
BY
Dawson, Tilton & Graham,
ATTORNEYS.

United States Patent Office 2,941,817
Patented June 21, 1960

2,941,817

ADJUSTABLE VEHICLE AXLE AND AIR SUSPENSION ASSEMBLY

William C. Benson, Augusta, Kans., assignor to Spencer-Safford Loadcraft, Inc., Augusta, Kans., a corporation of Kansas Filed Mar. 21, 1955, Ser. No. 495,392

3 Claims. (Cl. 280—124)

This invention relates to a vehicle axle assembly, and more particularly to an assembly for coupling the axle to the chassis of a vehicle. The invention is particularly useful in heavy trucks such as tractor trailer rigs.

In the past, vehicles have utilized an air cushion interposed between the axle and chassis thereof as a spring means. Axle alignment has been established and maintained by adjustable radius rods, and starting and stopping torque has been transferred from the axle to the chassis by torque bars. In such structural arrangements, the upper and lower faces of the spring, which are respectively adjacent the chassis and axle, have not been parallel, and more especially, have not both been horizontal. Instead, the lower surface has been inclined forwardly and upwardly, and a substantial portion of the air spring area has thereby been lost so far as cushioning between the chassis and axle is concerned. That this is true may be ascertained readily by application of the fundamental concepts of force mechanics. A solution to this difficulty has long been desired.

It is, accordingly, an object of this invention to provide a vehicle axle assembly wherein this deficiency in the prior art is overcome. Another object of the invention is to provide a vehicle axle assembly in which an air cushion or air spring having horizontal top and bottom surfaces in parallel alignment serves as a cushion between a vehicle chassis and axle, and wherein means are provided for permitting and maintaining such alignment while transmitting both starting and braking torque from the axle to the chassis, and also maintaining axle alignment.

Still another object is in providing a vehicle axle assembly in which an air cushion spring is interposed between the chassis and axle of the vehicle, and wherein upper and lower radius rods are connected to the axle and are coupled to the chassis and serve both to maintain axle alignment with respect to the chassis, to transmit starting and braking torque from the axle to the chassis, and to maintain the top and bottom surfaces of the air cushion spring in horizontal parallel alignment at substantially all times. A further object of the invention is to provide an assembly as described wherein the upper and lower radius rods are pivotally connected respectively to the upper and bottom surfaces of the axle, and extend forwardly in spaced apart parallel alignment, and at their forward ends are pivotally connected to a torque bracket. The points of pivotal connection to the axle and to the bracket of each of the radius rods are in vertical alignment, whereby a parallelogram configuration results and is effective to accomplish the results set forth. Additional objects and advantages will appear as the specification proceeds.

An embodiment of the invention is illustrated in the accompanying drawing, in which—

Figure 1 is a broken side view in elevation of a vehicle axle assembly embodying the invention, and in which certain parts are shown in section for clarity; and Figure 2 is a transverse sectional view taken on the line 2—2 of Figure 1.

Figures 1 and 2 show the essential structural elements of a vehicle embodying the invention. The vehicle may be of the road class and, for example, may be a tractor-trailer rig. The vehicle comprises a chassis 10 having U-shaped channel members 11 and 12 extending longitudinally and transverse beams or U-shaped channel members 13 extending therebetween and rigidly secured thereto. Positioned below the chassis 10 and in spaced relation therewith is an axle 14 adapted at each end to provide a mounting for wheels that support the chassis.

Interposed between the chassis 10 and axle 14, adjacent opposite ends of the axle and in general vertical alignment with the channel members 11 and 12, are air cushion springs 15 and 16 that are hollow resilient members that may be formed of rubber-like material and that are adapted to receive air or other fluid under pressure. The spring members 15 and 16 serve to support the chassis 10 upon the axle 14, and to cushion the chassis and the load carried thereby from road shocks etc. reflected in the axle 14. Ordinarily, the springs 15 and 16 are connected to a pressure system that functions to maintain a predetermined spacing between the chassis 10 and axle 14. When a relatively light load is being carried by the chassis, the system serves to provide a given air pressure within the spring members; and if the load on the chassis is increased, a greater air pressure is pumped into the spring members.

The upper surface of each of the air cushions or springs is bonded to a saddle member 17 that may be generally L-shaped, while the lower surface of each of the spring members is bonded to a saddle member 18 that may be generally U-shaped. In effect, the saddle members 17 and 18 comprise respectively the upper and lower surfaces of the spring members, and as is shown in the drawing, these surfaces are in horizontal, parallel alignment. The upper saddle member 17 is secured to a face plate 19 of a mounting bracket 20 having an angular web 21 that is welded to or otherwise rigidly secured to the channel members of the chassis. The bottom saddle member 18 is secured to a U-shaped mounting bracket 22 having depending side walls that are rigidly secured to the axle 14 by any suitable means such as welding.

To prevent transverse sway or movement between the chassis 10 and axle 14, a sway bar 23 extends transversely across the chassis 10 and at one end is pivotally secured to an upper sway bracket 24 that in turn is welded or otherwise rigidly fixed to the chassis 10, and more specifically the transverse channel member 13 thereof. At its other end, the sway bar 23 is pivotally secured between the spaced apart walls of a lower sway bracket 25 that is fixedly secured to the axle 14. Ordinarily, shock absorbers 26 will be interposed between the chassis 10 and axle 14 so as to restrain the axle 14 against excessive movement relative to the chassis 10 such as might be encountered by severe bumps traversed by the wheels of the vehicle that are mounted on the axle 14. Conventional shock absorbers 26 may be employed, and they may be, for example, of the usual airplane type. The upper end of the shock absorbers will be connected to the chassis 10, and, as shown in Figure 2, are pivotally secured to the transverse channel member 13 while the lower ends of the shock absorbers will be connected to the axle 14. In the illustration given, the lower ends of the shock absorbers are pivotally connected to the bracket members 25.

Extending inwardly from the U-shaped bracket 22 is a flange 27 that has an opening therethrough that receives a limit rod 28 that extends downwardly through an appropriate opening in one of the transverse channel members 13. The limit rod 28 at its upper end is provided with a head that prevents the rod from being pulled downwardly through the opening in the member 13. At its lower end, the rod 28 receives and extends through a rubber bumper 29 and a nut 30 and washer 31 are received about the rod and are drawn tightly against the bumper 29. The limit rod assembly functions to prevent the axle 14 from being moved away from the chassis 10 except within the limits provided by the rod 28. On the other hand, the rod does not prevent movement of the axle 14 and chassis 10 toward each other. The limit rod assembly is conventional and is found in most vehicle structures.

Rigidly secured to the chassis 10 and on each side thereof, and specifically to the longitudinally extending channel members 11 and 12, are torque brackets 30. Each of the torque brackets 30 comprises a web 31 secured to the channel member by bolts or rivets 32, or by other means that provide a rigid connection therebetween, and spaced apart depending legs 33 that are rigidly secured to the webs 31 by welding, as is shown in Figure 1. Extending transversely between the depending legs 33 is a brace 34 that is secured rigidly to each of the legs and serves to stiffen or reinforce the leg structures. Extending between the torque bracket 30 and the axle 14 is an upper radius rod 35 and a lower radius rod 36. The radius rods 35 and 36 extend longitudinally relative to the chassis 10 in spaced apart, substantially parallel alignment. The lower rod 35 extends above the axle 14, while the lower rod 36 extends below the axle 14. Each of the radius rods comprises a central elongated section 37 that at its forward end is adjustably received within a collar 38 and at its lower or rear end is adjustably received within a collar 39. Preferably, the central sections 37 are threadedly received within the collar members 38 and 39 so that they are adjustable longitudinally with respect thereto, and as is ordinarily conventional, each of the collar members has a split inner end portion that can be drawn tightly about the central section 37 by means of cap screws 40.

The upper and lower radius rods 35 and 36 are each pivotally secured to the torque bracket 30 through their forward collar members 38. The pivotal mounting is accomplished by means of shafts 41 and 42 that extend between the depending legs 33 of the torque bracket, and through enlarged end portions provided by the collar members 38. Preferably, bushings that are resilient and that may be formed of rubber, and that are designated with the numeral 43, are interposed between the rods or shafts 41 and 42 and the apertured end portions of the collar members 38. The shafts 41 and 42 are spaced apart and are in substantial vertical alignment, as is clear from Figure 1.

At their rear ends, the radius rods 35 and 36, through the collar members 39 and appropriate intermediate structure, are pivotally connected to the axle 14. The lower radius rod 36 has its collar 39 pivotally mounted upon a shaft 44 that extends through an enlarged end portion of the collar, and has interposed between it and the collar a rubber bushing 45. The shaft 44 extends between spaced walls of a depending bracket 46 that is rigidly secured by welding or other appropriate means to the axle 14. Similarly, the upper radius rod 35, and specifically the collar 39 thereof, is provided with an opening therethrough having mounted therein a rubber bushing 47 that has a bore therethrough that receives a shaft 48 that extends between the spaced apart depending walls of the bracket members 22, as is seen best in Figure 2. It is apparent from an inspection of Figure 1 that the shafts or pins 44 and 48 that provide the pivotal mountings for the radius rods 35 and 36 are in spaced apart vertical alignment. Thus, a parallelogram configuration is provided by the upper and lower radius rods 35 and 36 and the intermediate members extending between the shafts 41 and 42 at one end of the radius rods and the shafts 44 and 48 at the other ends of the radius rods. As is shown in Figure 2, the pins or shafts 44 and 48 may be in the form of bolt members that extend through one side wall of the bracket members and are threadedly received within the other wall of the bracket members.

In use of the structure, the mounting arrangement is provided as has already been described. The axle 14 may be aligned transversely with respect to the chassis 10 by simply loosening the bolt members 40 in each of the collar members, and by thereafter rotating the intermediate sections 37 of the rods so as to draw the axle 14 forwardly or to push it rearwardly, as is required to effectuate the desired alignment. After the adjustment, the cap screws 40 are tightened so as to lock the radius rods in the selected positions. It will be noted that the axle 14 can be rotated slightly through appropriate adjustment of the respective rods 35 and 36 so as to establish a condition of parallel alignment between the upper and lower surfaces of the air spring cushions. The cushions will be filled with a pressure fluid to provide therein an appropriate pressure for supporting the chassis 10 in the desired spaced relation with the axle 14.

When starting torque is applied to the axle 14, and during acceleration of the vehicle (assuming it is moving forwardly or toward the left as viewed in Figure 1), the axle 14 will tend to rotate in a counter clockwise direction, thus tensioning the radius rod 36 and placing the upper radius rod 35 under compression. These forces will be transferred directly to the torque bracket 30 and through that bracket to the chassis 10. Thus, the direct torque coupling is provided between the axle 14 and the chassis, and while the tendency of the axle is to rotate, there is actually no rotation but instead a direct force coupling transmitting torque from the axle to the chassis. The reverse condition exists during braking of the vehicle. At such time the axle 14 will tend to rotate in a clockwise direction, thus placing the lower radius rod 36 under compression and tensioning the upper radius rod 35. Thus again, a direct force coupling between the axle and torque bracket 30 is provided, with the result that axle torque is transferred directly to the chassis 10 of the vehicle.

The parallelogram configuration of the radius rod assembly permits the axle 14 to move up and down relative to the chassis 10 without changing the parallel relation between the upper and lower surfaces of the air cushion springs, or specifically the upper and lower saddle members 17 and 18. The radius rods then are effective to maintain the air cushion springs, and the upper and lower surfaces thereof, in the horizontal, parallel position shown in Figure 1 irrespective of axle movement relative to the chassis. At the same time, the upper and lower radius rods are effective to maintain transverse alignment of the axle 14 relative to the chassis 10, and further function to transfer torque directly from the axle 14 to the chassis, irrespective of the vertical spacing between the axle and chassis. At all times then, the complete area of the air cushion springs are employed for cushioning the axle and chassis. This result is achieved only when the upper and lower surfaces of the air cushions are maintained in horizontal relation and parallel with each other. No loss of effectiveness of the air cushion springs is present at any time as the vehicle is traveling along a roadway regardless of how bumpy or uneven the roadway may be.

While the upper and lower radius rods are effective to handle both starting and stopping torque, and to transmit the same directly from the axle to the chassis, they also maintain axle alignment, maintain the top and bottom surfaces of the air cushion springs in horizontal, parallel alignment, and in addition eliminate weight in comparison with structures heretofore used, and it will be appreciated that decreases in weight are exceedingly important in the trucking field.

While in the foregoing specification an illustrative embodiment of the invention has been set forth in considerable detail for purposes of describing the invention so as to have an adequate disclosure thereof, it will be apparent to those skilled in the art that numerous changes may be made in these details without departing from the spirit and principles of the invention.

I claim:

1. A road vehicle having a longitudinally extending chassis and positioned in vertically spaced relation therebelow a laterally extending axle adapted to carry road wheels at the ends thereof for rollingly supporting said vehicle, a pair of longitudinally extending and laterally spaced upper saddle structures respectively carried by said chassis along the bottom thereof in substantially horizontal disposition and being located above said axle in downwardly facing overhanging relation therewith, a pair of longitudinally extending and laterally spaced lower saddle structures respectively carried by said axle along the top thereof in substantially horizontal disposition and being respectively located below said upper saddle structures in upwardly facing underlying relation therewith, a pair of longitudinally extending air cushion springs respectively interposed between the associated upper and lower saddle structures and being fixedly secured thereto so as to be positively located with respect to both said chassis and axle, each of said air cushion springs being adapted to contain air under pressure defining a support column for resiliently supporting said chassis upon said axle, a pair of laterally spaced bracket structures secured to said chassis and extending downwardly therefrom in longitudinally spaced relation with said axle, two laterally spaced pairs of longitudinally extending radius rods respectively associated with said bracket structures and each of said pairs comprising vertically spaced and substantially parallel radius rods respectively located above and below said axle in generally horizontal disposition and pivotally connected adjacent one of their end portions to the associated bracket structure and pivotally coupled adjacent their other end portions to said axle, one of said radius rods in each of said two pairs being longitudinally adjustable to selective change the length thereof and such two adjustable radius rods being correspondingly located vertically with respect to said axle so that adjustment in the same direction of such two radius rods selectively rotates said axle in one or the other direction about the longitudinal axis thereof and thereby alters the disposition of said lower saddle structures relative to the respectively corresponding upper saddle structures whereby a condition of substantially horizontal parallelism can be correctively provided between the corresponding upper and lower saddle structures, said upper and lower radius rods being effective to transmit starting and braking torques from said axle to said chassis while constraining said axle against both longitudinal displacements and rotations about its longitudinal axis but without substantially restricting limited vertical displacements of said axle relative to said chassis and while maintaining the respectively associated upper and lower saddle structures in substantially planar horizontal parallelism so that the effective area of such supporting air column contained within each of said air cushion springs is maximized, and a laterally extending sway bar pivotally connected adjacent one end portion with said chassis and pivotally connected adjacent the other end portion with said axle to constrain the latter against lateral displacements with respect to said chassis but without substantially restricting limited vertical displacements of said axle relative to said chassis.

2. The vehicle of claim 1 in which the other two radius rods are also longitudinally adjustable whereby said axle can be shifted longitudinally through adjustment of said radius rods to adjust the lateral alignment of said axle.

3. The vehicle structure of claim 1 in which each of said upper saddle structures comprises a bracket rigidly secured to said chassis and a saddle member cooperative therewith and secured to the associated air cushion spring, and in which each of said lower saddle structures comprises a bracket rigidly secured to said axle and a saddle member cooperative therewith and secured to the associated air cushion spring.

References Cited in the file of this patent

UNITED STATES PATENTS

| | | |
|---|---|---|
| 1,946,060 | Buckendale | Feb. 6, 1934 |
| 2,089,607 | Hill | Aug. 10, 1937 |
| 2,290,620 | Brown | July 21, 1942 |
| 2,577,322 | Frazier | Dec. 4, 1951 |
| 2,691,420 | Fox | Oct. 12, 1954 |
| 2,706,113 | Hickman | Apr. 12, 1955 |
| 2,742,302 | Pointer | Apr. 17, 1956 |